Feb. 15, 1944.  J. L. HARRIS  2,341,774
TIME MECHANISM
Filed Dec. 30, 1939  5 Sheets-Sheet 1

Inventor
John L. Harris
By George H. Fisher
Attorney

Inventor
JOHN L. HARRIS

By
George H. Fisher
Attorney

Feb. 15, 1944.   J. L. HARRIS   2,341,774
TIME MECHANISM
Filed Dec. 30, 1939   5 Sheets-Sheet 3

Inventor
John L. Harris
George H. Fisher
Attorney

Feb. 15, 1944. J. L. HARRIS 2,341,774
TIME MECHANISM
Filed Dec. 30, 1939 5 Sheets-Sheet 4

Inventor
John L. Harris
By
George H. Fisher
Attorney

Feb. 15, 1944.        J. L. HARRIS        2,341,774
TIME MECHANISM
Filed Dec. 30, 1939        5 Sheets-Sheet 5

Inventor
John L. Harris
By George H. Fisher
Attorney

Patented Feb. 15, 1944

2,341,774

UNITED STATES PATENT OFFICE 2,341,774

TIME MECHANISM

John L. Harris, Minneapolis, Minn., assignor to Minneapolis-Honeywell Regulator Company, Minneapolis, Minn., a corporation of Delaware Application December 30, 1939, Serial No. 311,799

7 Claims. (Cl. 74—122)

My invention relates to improved forms of electrically driven timing devices adapted to be employed in combination with thermostats or the like and switches.

An object of my invention is the provision of a novel speed reducing mechanism embodying relatively few parts, occupying a minimum of space and yet capable of effecting an unusually great speed reduction.

Another object of my invention is to provide a speed reduction mechanism embodying gears driven at different speeds and reciprocatory mechanism arranged to be operated through one cycle in a time interval depending on the difference in speeds of the gears.

Another object of my invention is to provide a clock mechanism embodying a speed reduction arrangement wherein two gears are driven at different speeds and a reciprocatory element is moved an amount depending on the difference in speeds of the gears, the reciprocatory element cooperating with pawl and ratchet means to turn a time indicating rotary member.

Numerous other objects and advantages of my invention will become apparent from the following detailed description and annexed drawings wherein:

Figures 1, 2, 3:
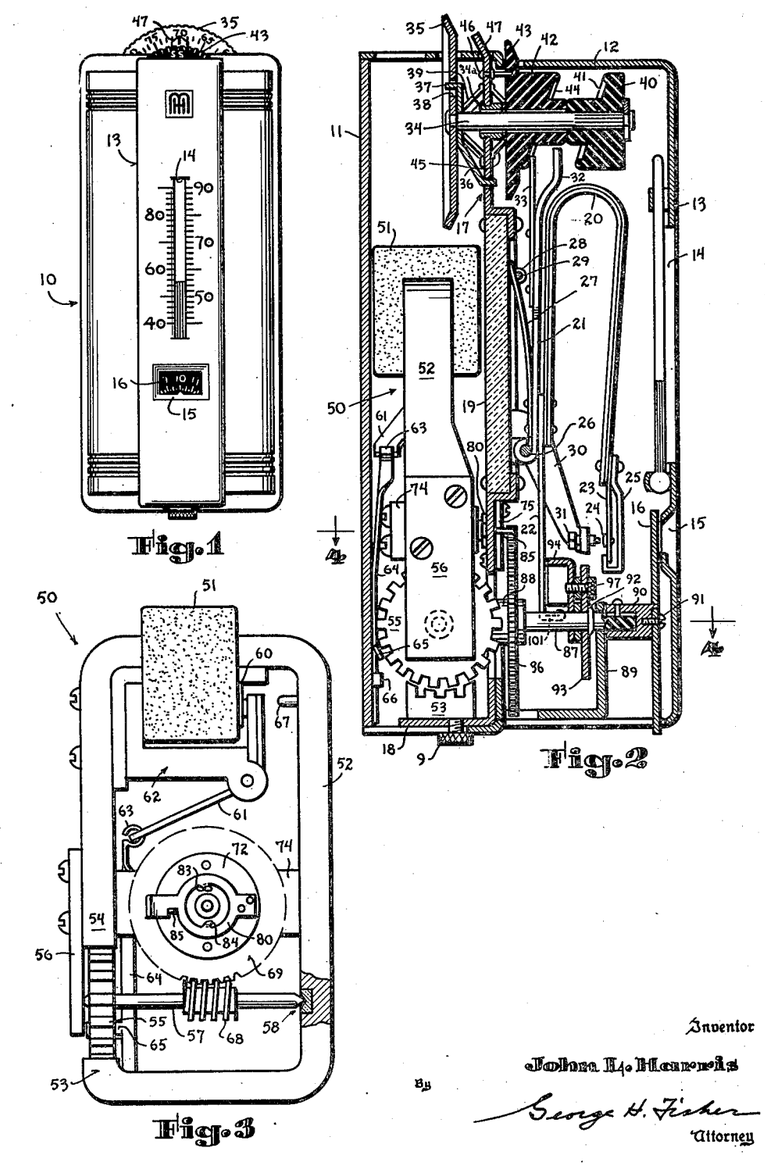
Figure 1 is a front exterior view of a time controlled thermostat embodying my invention.
Figure 2 is a cross sectional side view of the complete assembly of the thermostat and timing mechanism.
Figure 3 is a view of the motor and part of the gear train of the timing unit.

Referring to the drawings, Figure 1 is a front view of a time controlled thermostat, numeral 10 designating generally a casing enclosing the thermostatic member and the time clock. The casing 10 comprises a rear portion 11 having openings for air circulation and in which the timing mechanism is located and a front portion 12 (see Figure 2) which encloses the thermostatic mechanism. The casing 10 has a portion 13 forming a panel having a slot 14 therein and an opening 15. The edges of the slot 14 are graduated in degrees of temperature and within the portion 12 in line with the slot 14 there is a mercury thermometer as shown held in position by suitable clips. A timing dial 16 is visible through the opening 15 in the panel 13.

The portions 11 and 12 of the casing 10 are separated by a panel 17, the lower portion of which is bent at a right angle as seen at 18, the casing 10 being removably secured to this portion by screw 9. There is an opening in the central portion of the panel 17 and the edges of the material of the panel 17 around this opening are flanged so as to form a continuous shoulder around the opening. In interfitting engagement with this shoulder so as to cover the opening in the panel 17 is a piece of insulating material 19 which is attached to the panel 17 by means of rivets or the like.

The thermostatic mechanism comprises a U-shaped bimetallic element 20, one end of which is attached by riveting or the like to a supporting bracket 21, one end of an adjusting lever 22 being attached also to the bracket 21 between the bracket and the end of the thermostatic element. At the other end of the thermostatic element there is attached by riveting or the like a contact bracket 23 carrying an electrical contact 24. Also attached to this end of the thermostatic element is a rigid stop or backing member 25 for the contact bracket, the lower end of the backing member 25 being bent up in the form of a U as shown to limit leftward movement of the contact bracket 23. The bracket 21 is carried on a pivot 26 which is journalled in ears extending out from the material of the panel 17. Numeral 27 designates a flexible leaf spring one end of which is attached to the bracket 21 by riveting or the like and the other end of which has an ear 28 engaged on a pivot pin 29 extending through a similar ear forming part of the material of the panel 17. The leaf spring 27 continuously urges the bimetal element 21 in a clockwise direction about the pivot pin 26. Numeral 30 designates a contact bracket formed integrally with the panel 17 and extending downward, this bracket carrying a contact screw 31 which is in a position to be engaged by the contact 24. The upper end of the bracket 21 is bent as shown at 32 and attached to the bracket 21 near its upper end is a metal strip 33, this latter strip and the bent portion 32 of bracket 21 taking relative positions whereby to be actuatable by manual adjusting means for the thermostatic mechanism.

Referring now to the manual adjusting means, numeral 34 designates a shaft passing through a bearing 34a mounted in the panel 17. Attached to the left end of the shaft 34 is a day dial 35 graduated in degrees of temperature, this dial also being visible on Figure 1. Numeral 36 designates a bracket through which the shaft 34 passes, the bracket having an ear or projection extending through the panel 17, this bracket additionally serving as a support for the shaft 34 and having a prong or finger 37 extending through an arcuate slot 38 in the dial 35, the finger 37 serving as a stop to limit rotation of the dial 35 in one direction or the other. Numeral 39 designates a spider having a plurality of flexible arms, this spider being interposed between the bracket 36 and the upper part of the panel 17 and acting to urge the dial 35 and shaft 34 in a leftward direction. Secured to the right end of the shaft 34 is a rotatable cam member 40 which may be made of plastic material and which has a cam surface 41 which is arranged to be engaged by the bent portion 32 of the bracket 21 at certain times. Rotatably engaged on the shaft 34 to the left of the member 41 is a rotatable cam member 42, this member having a night dial portion 43 and a portion 44 forming a cam surface adapted at times to be engaged by the upper end of the metal strip 33. The upper portions of the dials 43 and 35 extend through openings in the casing 10 as shown. Interposed between the rotatable member 42 and the bearing 34a is a spider 45. Numeral 46 designates a stop pin extending to the right from panel 17, its end being situated in an arcuate slot in the rotatable member 42 and serving to limit rotation of this element in one direction or the other. Numeral 47 designates a pointer formed of the material of panel 17 and extending upwardly and having an index marker thereon arranged to cooperate with the graduations on the dials. It will be understood that the flexibility of the spider 39 urges the dial 35 to the left and consequently causes the shaft 34 to maintain the rotatable members 40 and 42 in their proper respective relative positions. With the parts in the position shown, the strip 33 is engaging the cam surface 44 of rotatable member 42 and thus when the night dial 43 is manually adjusted the cam surface will act on the strip 33 and will adjust the position of the thermostatic element 20 about its pivot 26. As will be pointed out later, the thermostatic mechanism may be so positioned that the bent portion 32 of bracket 21 may be brought into engagement with the cam surface 41 of rotatable member 40 so that the position of the thermostatic element may be adjusted by adjusting the day dial 35.

The timing mechanism which I employ for automatically adjusting the thermostatic mechanism will now be described. In Figure 2 the timing mechanism as shown includes an electric motor designated generally at 50, this motor unit being also shown separately in Figure 3. The motor unit comprises windings 51 and a more or less oval shaped core 52 as may be best seen in Figure 3. The core has portions 53 and 54 forming pole pieces disposed on opposite sides of a rotor 55. Numeral 56 designates a rectangular bracket secured to the core 50 by screws, this bracket serving as a bearing to support one end of a shaft 57 on which the rotor 55 is mounted. The other end of the shaft 57 is supported in a needle point jewel bearing 58, the jewel being mounted in the core 50. The motor is of the magnetic type and the pole pieces and rotor each have such relative numbers of teeth so as to cause the motor to rotate at a speed of 360 revolutions per minute when the windings 50 are energized with 60 cycle alternating current.

The motor unit 50 is of the self starting type, the starting mechanism including an armature 60, within the windings 51. The armature 60 is attached to a bell-crank lever 61 which is pivoted to an ear forming part of a bracket 62 secured to the core 52 by means of screws. The other end of the bell-crank lever 61 engages a hook 63 on the upper end of a member 64 having an ear 65 adapted to engage the teeth on the rotor 55 when the member 64 is moved vertically. Thus when the windings 51 are energized, the armature 65 is moved to the left and the bell-crank lever 61 is operated in a direction to move the member 64 downwardly whereupon the ear 65 in moving to the position shown in Figure 2 engages one of the teeth of the rotor 55 so as to start the motor. Upon deenergization of the windings 51 the member 64 moves upwardly to be in position for the next starting operation. Numeral 66 designates a guide for the member 64 and numeral 67 designates a stop to limit movement of the bell-crank lever 61.

Figure 4:
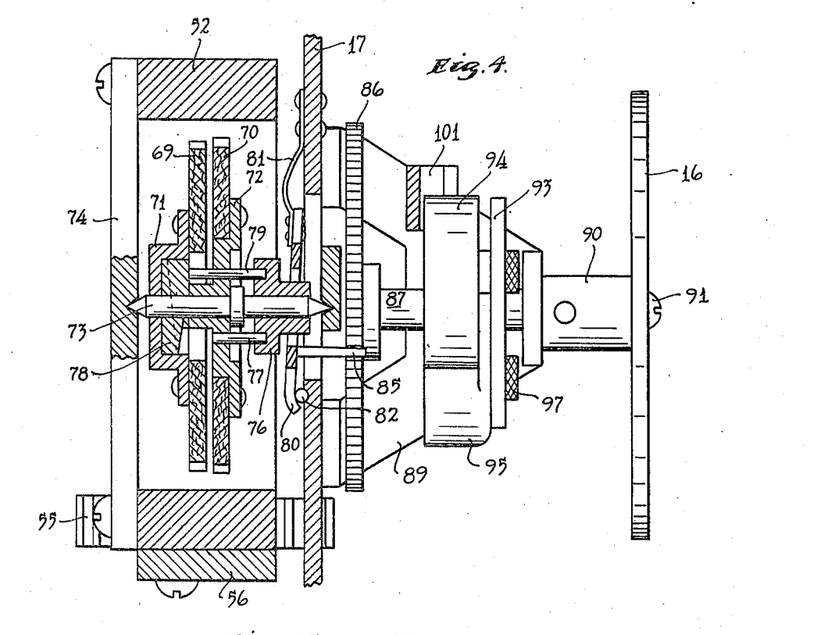
Figure 4 is a sectional view on an enlarged scale taken along line 4—4 of Figure 2.

Mounted on the shaft 57 is a worm gear 68 which drives a pair of gears 69 and 70 as may be seen in Figure 4. The gears 69 and 70 have different numbers of teeth, for example, in this particular embodiment of the invention the gear 69 may have 80 teeth and the gear 70 may have 81 teeth. Secured to the central portion of the gear 69 is a cup 71 and secured to the central portion of the gear 70 is a disc member 72 having a bearing portion, the cup 71 and bearing portion of disc 72 serving as means for mounting the gears 69 and 70 on a shaft 73. The left end of the shaft 73 forms a needle point mounted in a bearing in a bracket 74 secured to the core 52 by screws as shown. The right end of the shaft 73 also forms a needle point engaged in a bearing in a metal bracket 75 attached to the panel 17 by a screw and depending therefrom adjacent the opening in the panel 17. Rotatably mounted on the shaft 73 is a collar 76 having a portion of smaller diameter so that a shoulder is formed by this portion and the other portion of the collar. The collar 76 is secured to the disc 72 by a pin 77 so as to rotate therewith. Frictionally engaged within the cup 71 is a cam 78 having a helical surface which continuously engages a cam follower in the form of a pin or rod 79 which is attached to the collar 76 and which extends through the disc 72. Cam 78 has one abrupt drop off which is at the top of the cam as seen on Fig. 4. From the foregoing it will be understood that by reason of the gears 69 and 70 having different numbers of teeth that they rotate at slightly different speeds and therefore by reason of the different speeds there will be a relative amount of motion between cam 78 and cam follower 79 dependent on the difference in speeds. That is, with the gears 69 and 70 having 80 and 81 teeth, respectively, there will be one revolution of one gear with respect to the other for every 6480 revolutions of the motor shaft 57. In other words, for every 6480 revolutions of the shaft 57 there will be one revolution of the cam 78 relative to the follower 79 and hence there will be one cycle of axial movement of the collar 76 for every 6480 revolutions of the shaft 57, it being understood of course that the action of the cam 78 on the follower 79 is to reciprocate the collar 76 on the shaft 73 by reason of the helical surface of the cam 78, collar 76 normally being urged to the left as will presently be described and abruptly moving to the left when the cam follower drops off the drop off on cam 78.

Figure 4A:
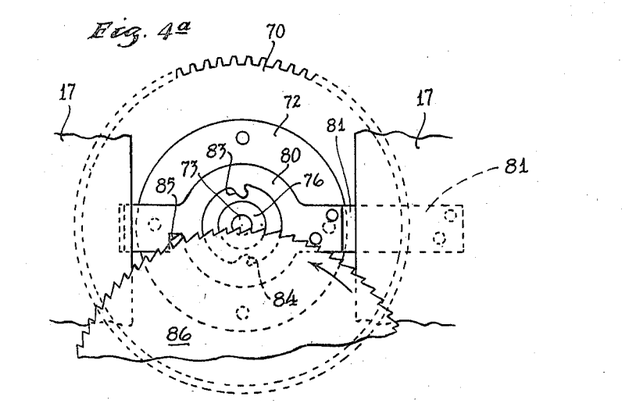
Figure 4a is an elevational view of a portion of the pawl and ratchet mechanism, the view being on the same scale as Figure 4.

The portion of the collar 76 of smaller diameter extends through an opening in a member 80, which member is fastened to the panel 17 by means of a resilient bracket or spring member 81. The opposite end of the member 80 is bent over slightly and normally engages a stop 82 on the panel 17. There are a pair of ears 83 and 84, best seen in Figures 3 and 4a, which extend to the left as viewed in Figure 4 from the inner edges of the opening in the member 80 and which are adapted to be engaged by the shoulder of collar 76 when the collar is moved to the right as viewed in Figure 4. The member 80 also has a finger or projection 85 which extends to the right through the opening in the panel 17 as may best be seen on Figure 4. The finger 85 is in effect a pawl which engages with a ratchet wheel 86 mounted on a shaft 87. From the foregoing it will be seen that as the collar 76 is reciprocated to the right, its shoulder engages the member 80 and causes it to pivot about the stop 82 with the spring member 81 flexing. When this action occurs, the finger or pawl 85 moves downwardly as seen on Figure 4, engages the ratchet wheel 86 and rotates it in a direction which would be counter-clockwise looking at Figure 4a. When the cam follower 79 engages the portion of cam 78 permitting movement to the left, the spring member 81 acting through member 80 forces the collar 76 to the left, and causes the finger 85 to be withdrawn from the ratchet wheel 86 for the next cycle of operation. At this time, the member 80 disengages stop 82. Thus for each cycle of axial movement of the collar 76 the ratchet wheel is advanced one tooth and therefore if this ratchet wheel is provided with 80 teeth, for example, the total speed reduction provided is 6480×80 or 518,400 to one.

The shaft 87 is supported in a bearing 88 and in a bearing formed in a bracket 89, the bracket 89 having a horizontal portion as seen in Figure 2 and upstanding portions which may be fastened to the panel 17. To the right of the bracket 89 the shaft 87 is secured to a collar 90 by any suitable means to which collar is secured the time dial 16 by means of a screw 91.

With the shaft 57 rotating at a speed of 360 revolutions per minute and with a speed reduction of 518,400 to one as described, the timing mechanism would rotate the time dial 16 one revolution every twenty-four hours. The time dial 16 has half of its surface light and graduated to designate times from 6:00 a. m. to 6:00 p. m., and has the other half of its surface dark and graduated to designate times from 6:00 p. m. to 6:00 a. m. The instrument of Figure 1 therefore indicates a time of 10:00 p. m.

The purpose of the timing mechanism is to automatically adjust the setting of the thermostat. Secured on the shaft 87 adjacent a collar 92 is a time disc or dial 93. There are also a pair of segmental elements 94 and 95 having cam surfaces, the segmental elements being relatively adjustable with respect to the disc 93. For a better understanding of the elements being described reference may be had to Figure 5 which is an exploded view of these elements and the time dial 16.

Figure 5:
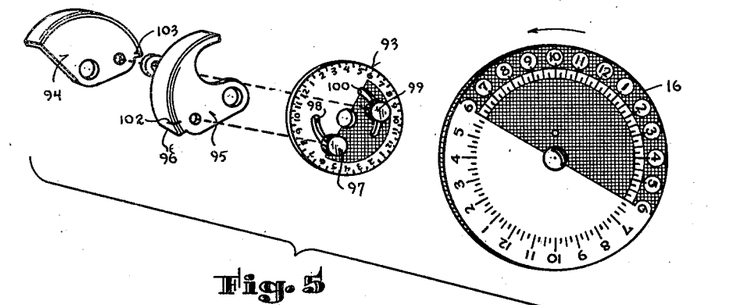
Figure 5 is an exploded view of manual adjusting means for adjusting the times at which the timing means automatically adjusts the thermostat.

As may be seen on Figure 5, the segmental elements 94 and 95 have flanges at their peripheries which form their respective cam surfaces, the cam surface of element 95 overlapping the cam surface of the element 94 as may be seen on Figure 4.

Figures 6, 7:
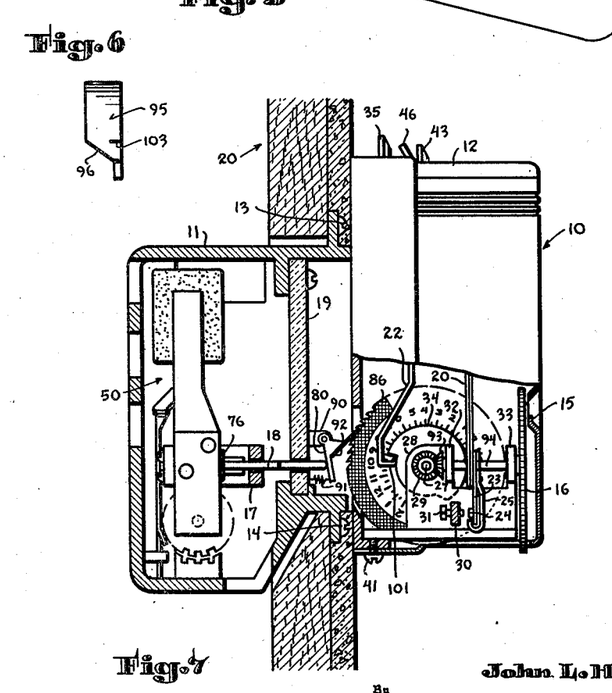
Figure 6 is a view of the day cam shown in Figure 5.
Figure 7 is a cross-sectional view of a complete assembly of another form of my invention.

The leading edge of the cam surface of the element 95 is cut off at an angle as shown at 96 in Figure 6. The segmental element 95 is attached to the dial 93 by a thumb screw 97 which extends through an arcuate slot 98 in the disc 93, there being a small washer on the thumb screw 97 to space the element 95 from the disc 93. The element 94 is attached to the disc 93 by a similar thumb screw 99 which passes through an arcuate slot 100 in the disc 93, there also being a small washer on screw 99 for properly spacing the element 94 and disc 93. The disc 93 has half of its surface shaded and the other half unshaded and is graduated in a manner similar to that of the time dial 16, the shaded half of disc 93 representing times from 6:00 p. m. to 6:00 a. m. and the unshaded half of the disc representing times from 6:00 a. m. to 6:00 p. m. The elements 94 and 95 are adjustable on the shaft 87 by means of loosening the respective thumb screws 97 and 99. By thus adjusting the elements 94 and 95, the combined extent of the cam surface of the two elements can be adjusted.

Referring to Figures 2 and 4 it will be noted that the lower end of the adjusting arm 22 is bent at a right angle as indicated at 101. Thus when the elements 94 and 95 are rotated in a counter-clockwise direction as seen on Figure 5, the angular portion 96 of the cam surface of element 95 will engage the angular portion 101 of adjusting arm 22 and will move the lower end of the arm 22 to the left so as to adjust the thermostatic element 20 in a clockwise direction about its pivot so as to bring the portion 32 of bracket 21 into engagement with the cam surface 41 of member 40. It will be understood that as the elements 94 and 95 are rotated the portion 101 of arm 22 will first be in contact with the angular edge 96 of element 95 and will then remain in engagement with the left edge of the flanges forming the cam surfaces of elements 94 and 95 until it disengages from the opposite end of the cam surface of element 94. With the parts in the position shown in Figures 2 and 4, the arm 22 has just disengaged from the cam surface of element 94. The element 95 has an index marker 102 and the element 94 has an index marker 103 and these markers are used to adjust the elements with respect to the graduations on the disc 93. It will also be understood that when the thermostatic element 20 is automatically rotated in a clockwise direction as described above the instrument is placed on the day setting, as previously described, this setting being manually adjustable by the dial 35. In other words, when the cam surface of element 95 engages the portion 101 of arm 22, the instrument is placed on the day setting. Thus if the index marker 102 of element 95 is adjusted to a position adjacent the numeral 5 on the shaded half of disc 93, the instrument will go on the day setting at 5 o'clock in the morning. The disc 93 is of course properly relatively positioned with respect to the time dial 16 so that if the element 95 is adjusted for placing the instrument on the day setting at 5 o'clock in the morning as just described, at such time the disc 93 and the elements 94 and 95 will have been rotated to such a position that the leading edge of the cam surface of element 95 is just about to engage the portion 101 of arm 22.

The position of the element 94 determines the time in the evening when the instrument will go back to the night setting. Thus if the index marker 103 on the element 94 has been placed adjacent the numeral 9 on the shaded half of the disc 93 the instrument will go on the night setting at 9 o'clock in the evening. In other words, under these circumstances at 9 o'clock in the evening the disc 93 and the elements 94 and 95 will have been rotated to such a position that the portion 101 of arm 22 is just about to drop off the cam surface of element 94.

Referring now to Figure 7 of the drawings wherein I have shown another modification of my invention, numeral 10 designates generally an instrument similar to that of the previous embodiment but incorporating various different features which will now be described. In this figure numeral 20 designates a wall or partition of a building, this wall or partition having an opening therein forming a recess in which is received a portion 11 of the casing housing the different parts of the instrument. The other portion 12 of the casing houses the thermostatic mechanism and is disposed on the surface of the wall as shown. The portion 11 has ears or brackets 13 and 14 which provide for fastening the instrument to the wall by means of screws as shown. The casing portion 11 forms a housing for the timing mechanism as in the previous embodiment. The timing mechanism comprises generally a motor unit 50 which is substantially the same as in the previous embodiment and therefore need not be described again. However, in the present embodiment the reciprocable collar 76 is connected to a push rod 18 which extends through an opening in a bracket 17. Numeral 19 designates a piece of insulating material which forms a partition insulating the casing portion 11 from the portion 12 of the instrument. The push rod 18 extends through an opening in the insulating material 22 and engages a pivoted element 80 which is pivoted to an ear 90. The element 80 is urged against the push rod 18 by a coil spring 91. Integrally formed with the element 80 is a projection or finger 92 which acts as a pawl in cooperation with the ratchet wheel 86, the ratchet wheel 86 being disposed within the casing portion 12, and there being a portion of the ratchet wheel protruding through an opening in the left wall of the casing portion 12 as shown. The ratchet wheel 86 is mounted on a shaft which shaft is supported in a bracket 28 upstanding from the lower part of the housing portion 12. On the shaft 27 is a bevelled pinion gear 29 which drives another bevelled gear 93 on a shaft 94 which drives the time dial 16 corresponding to the time dial of the previous embodiment. The shaft 94 is supported by a pair of ears 32 and 33 formed integrally with the bracket 28. Half of the ratchet wheel is shaded at its periphery and the other half is unshaded and it is graduated in the same manner as the time dial 16 as shown on Figure 7. Numeral 34 designates a cam driven by the shaft 27 which cooperates with the lower end of the adjusting arm 22 corresponding to that of the previous embodiment, the adjusting arm 22 having an angular portion 101 at its lower end similarly to that of the preceding embodiment. The thermostatic element 20 is substantially the same in the present embodiment as in the preceding embodiment and carries an electrical contact blade 23 having a contact 24 cooperable with a fixed contact screw 31 carried by a bracket 30 the same as in the previous embodiment. Numeral 25 indicates a rigid backing member for contact blade 23.

The present embodiment operates substantially the same as the preceding form of the invention, the cam 34 acting to move the adjusting lever 22 so as to adjust the instrument between its day and night settings. The present form of the invention has the advantage of making the apparent size of the instrument no larger than thermostats of the ordinary type not employing timing mechanism. In the present form of the invention the timing mechanism is located behind the thermostat itself and is concealed in a recess in the wall so that the casing portion 12 is the only visible part of the instrument and as stated above may have a very small size.

Figure 8:
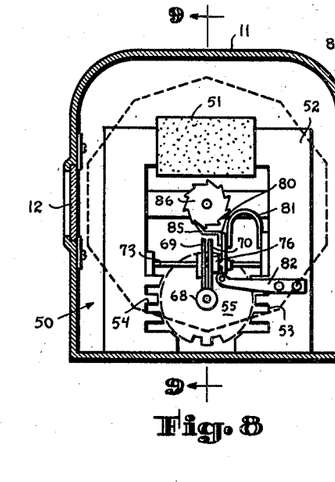
Figure 8 is a view of another embodiment of my invention incorporated in a time clock, this view being taken along line 8—8 of Figure 9.
Figure 9:
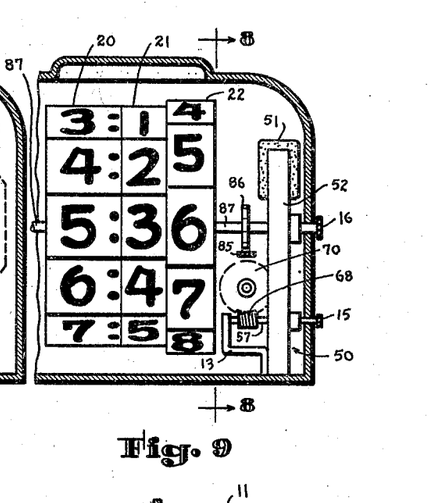
Figure 9 is a view taken along line 9—9 of Figure 8.

Figures 8 and 9 represent another form of my invention wherein my improved timing mechanism is applied to a direct reading type of clock. In Figure 8 the timing unit is disposed within a casing 11 having a glass window 12 in the side, the glass being held in place by suitable brackets and screws as shown. The timing unit is very similar to that of the embodiment of Figures 2, 3 and 4 comprising windings 51 and a core 52 including pole pieces 53 and 54. The rotor as indicated at 55 drives a worm gear 68 mounted on a shaft 57, the shaft 57 being supported by the core 52 and a suitable bracket 13 as may be seen on Figure 9. The worm gear 68 drives a pair of gears 69 and 70 the same as in the first embodiment. In the present embodiment the collar 76 acts on a pivoted lever 80, the lever 80 being pivoted to an arm 82 secured to the core 52 by means of riveting or the like. Disposed between the opposite end of the lever 80 and the core 52 is a U-shaped leaf spring 81 which must be compressed when the collar 76 urges the lever 80 in a clockwise direction about its pivot. Attached to the lever 80 is a pawl 85 cooperating with and arranged to operate a ratchet wheel 86 on a shaft 87. In the present embodiment, as may be seen, the abrupt leftward movement of lever 80 and pawl 85 acts to rotate ratchet wheel 86 an increment at a time with a snap movement, a tension being of course gradually built up in leaf spring 81 as collar 76 moves to the right.

The motor of the present embodiment has 12 poles and rotates at a speed of 600 revolutions per minute. The gears 69 and 70 have 24 and 25 teeth, respectively, so that the speed reduction produced will be 24 × 25 or 600 to 1, that is for 600 revolutions of worm gear 68 there will be one revolution relatively of gears 69 and 70 and one axial cycle of collar 76. It follows therefore that inasmuch as worm gear 68 is rotating at a speed of 600 revolutions per minute there will be one cycle of pawl 85 each minute. In the present embodiment ratchet wheel 86 has 10 teeth so that it will be advanced one increment per minute thereby making one revolution in 10 minutes.

The time indicating mechanism is shown in Fig. 9, this mechanism being of the speedometer type which is well known in the art in counters, etc., and the details of which form no part of my invention. This mechanism includes a first rotor or drum 22 bearing numerals from 0 to 9 on flat faces of the drum. Drum 22 is mounted on and driven by shaft 87 so that every minute the drum is abruptly advanced one increment to bring the next succeeding numeral into registry with window 12, the window being adjacent the drum as may be seen in Fig. 8.

The timing indicating mechanism also includes similar rotors or drums 20 and 21, drum 21 bearing two series of numerals ranging from 0 to 5 on flat faces of the drum, and drum 20 bearing numerals from 1 to 12 on flat faces of the drum, drums 20 and 21 thus having the same number of flat faces.

Drums 20 and 21 are rotatable on shaft 87 and the operating mechanism for these drums is such that each time drum 22 makes a complete revolution drum 21 is advanced one increment, and whenever drum 21 has advanced six increments (which will of course require one hour) drum 20 will be advanced one increment. The numerals on drums 20 and 21 which are adjacent the numeral on drum 22 which is brought into registry with window 12 also registry with window 12 and as will now be apparent these numerals indicate the time in hours and minutes.

In Figure 9 numeral 15 designates a manual knob for rotating the shaft 57 for purposes of starting the electric timing motor. Numeral 16 designates a manual knob on shaft 87 which is for purposes of adjusting the setting of the time indicating mechanism.

The present embodiment of the invention has the advantage that because of the compactness of my particular timing motor and the gear train, a very small and compact clock may be constructed at low cost.

Figure 10:
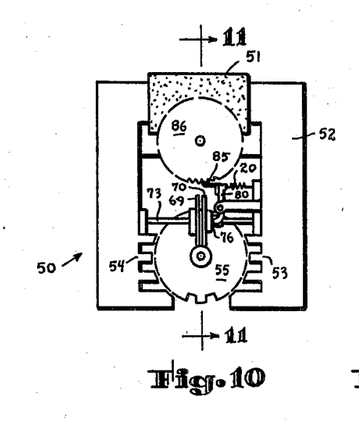
Figure 10 is a view of a form which the timing motor unit of my invention may take, this view being taken along line 10—10 of Figure 11.
Figure 11:
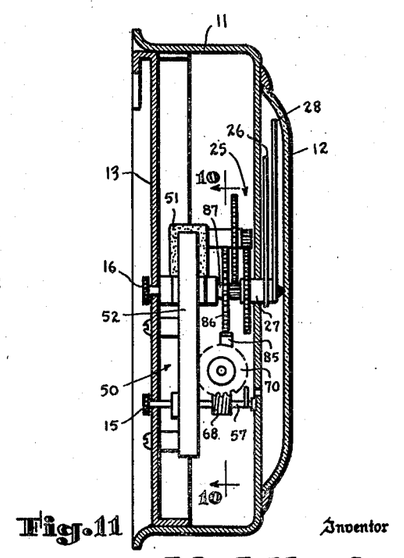
Figure 11 is a cross-sectional view of a clock utilizing the timing motor unit of Figure 10, the view of the timing motor unit being taken along line 11—11 of Figure 10.

Figures 10 and 11 disclose a further embodiment of my invention wherein the timing unit is applied to a clock of a different type. In Figure 11 the clock is shown as having a casing 11 with a glass face 12 and a back plate 13. The timing unit is very much the same as that of the previous embodiment being suitably supported in casing by screws and spacing members as shown. However, in the present embodiment the collar 76 acts on a pivoted lever 80 which is of a slightly different shape than that of the previous embodiment and is normally biased in a clockwise direction by a coil spring 20. The lever 80 carries a pawl 85 which cooperates with and is arranged to rotate a ratchet wheel 86. In the present embodiment as shown in Figure 11, knobs 15 and 16 are provided for purposes of starting the timing unit and for adjusting the time indicating mechanism, these knobs being exterior of back plate 13. In the present embodiment the ratchet wheel 86 is mounted on the shaft 87 and it drives a gear train generally indicated at 25. Numeral 26 indicates a minute hand carried by a collar 27 which is driven at the proper speed by the gear train 25. Numeral 28 designates an hour hand mounted on the shaft 87 and which is driven at a speed so that it makes one complete revolution in twelve hours.

Figure 12:
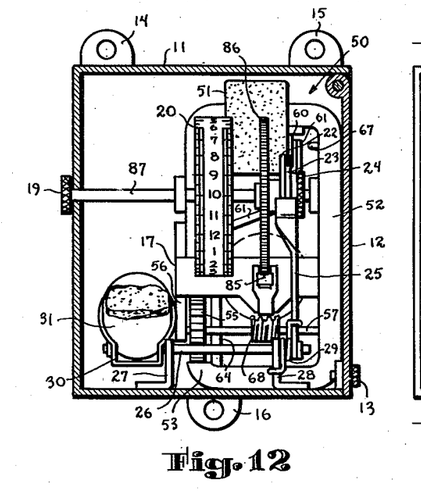
Figure 12 is a view of another embodiment of my invention applied to a switch, this view being taken along line 12—12 of Figure 13.
Figure 13:
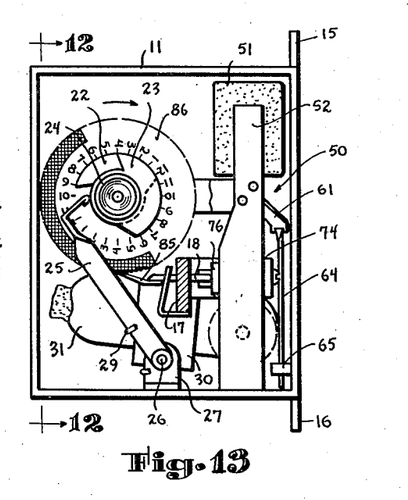
Figure 13 is a side view of the embodiment of Figure 12.

Figures 12 and 13 of the drawings represent a further modification of my invention wherein I have shown my improved timing mechanism as applied to a time switch. In these figures numeral 11 designates a housing for the time switch, the housing having a hinged cover 12 providing access to the interior thereof and which may be secured in closed position by means of a screw 13. The housing 11 has brackets 14, 15, and 16 whereby it may be mounted on a vertical wall.

The timing motor unit 50 is substantially the same as that of previous embodiments, it having windings 51, a core 52 and a rotor 55 as previously described. The motor of the present embodiment is of the self-starting type as in the first embodiment, there being an armature 60 within the windings 51 attached to a bell-crank lever 61 which in turn is connected to a member 64 which is arranged to move vertically in a guide 65 in the same manner as described in the first embodiment for imparting an impulse to the rotor when the windings are energized for the purposes of starting the motor in operation.

In the present embodiment there is a worm gear 68 mounted on the shaft 57 which drives a pair of gears at slightly different speeds just as in the previous embodiments. Also as in previous embodiments there is a reciprocatable collar 76 which actuates a push rod 18 which extends through a bracket 17, the bracket being attached to the core 52. Carried by the push rod 18 is a pawl 85 which actuates a ratchet wheel 86 mounted on the shaft 87. The shaft 87 is journalled in bearings formed in brackets supported by the core 52 and its left end, as seen in Figure 12, extends exteriorly of the housing 11 and has a knob 19 thereon for purposes of adjusting the position of the ratchet wheel as will be described. Mounted on the shaft 87 is a time indicating wheel or drum 20 bearing the numerals 1 to 12 on its surface. The shaft 87 makes one revolution every twelve hours and the drum 20 is positioned adjacent an opening or window in the casing 11 so that one of the numbers on the drum is always in registry with the window. Half of the ratchet wheel 86 is shaded at its periphery and the other half is unshaded and it is graduated in the same manner as the time dial of previous embodiments. Mounted on the shaft 87 to the right of the ratchet wheel 86 as seen on Figure 12 are two similar cam elements 22 and 23. It will be seen that each of these cam elements has a rise and an abrupt drop-off, the portions between the rise and drop-off being of uniform circular conformation. Normally these two cam elements which are adjustable on the shaft 87 overlap each other a certain amount so that together they produce a cam contour having a portion of uniform circular conformation which is of relatively greater extent than the circular portion of the contour of either cam element alone. Numeral 24 designates a thumb nut on the shaft 87 adjacent the cam elements 22 and 23 and which can be drawn up so as to tightly secure the cam elements against a collar adjacent the ratchet wheel 86. When the thumb nut 24 is loosened the cam elements 22 and 23 can be adjusted relatively to each other to vary the angular extent of the cam contour portion of uniform circular conformation produced by the two cam elements together. In other words, the angular distance between the rise on one cam and the drop-off on the other can be adjusted. Cooperating with the cam elements 22 and 23 is a cam follower arm 25 which follows out the surface of the cam elements. The other end of the cam follower arm 25 is attached to a shaft 26 supported in brackets 27 and 28 at the bottom of the housing 11. Numeral 29 designates a coil spring on the shaft 26 having one end engaging the bracket 28 and the other end engaging the arm 25 and urging the arm 25 in a direction so that its end follows out the contour of the cam elements. Secured to the other end of the shaft 26 is a resilient bracket 30 carrying a mercury switch 31.

With the parts in the position shown the cam follower arm is adjacent a portion of one of the cam elements of smaller radius and the shaft 26 and mercury switch 31 are in a position wherein the mercury switch is open. The cam elements are rotated in a clockwise direction as seen on Figure 13 and as will be seen, when the cam follower arm 25 follows out the rise on cam element 23 the cam follower arm and shaft 26 will be rotated in a counter-clockwise direction so as to tilt the mercury switch 31 and make contact between its electrodes which are at the left end of the mercury switch. The mercury switch will stay in this position while the cam follower arm 25 continues to follow out the contour of both of the cam elements and until it eventually drops off the cam element 22 whereupon the mercury switch will be returned to the position shown in the drawings. As previously described, the relative duration of times during which the mercury switch is open and closed may be adjusted by manually adjusting the positions of the cam elements 22 and 23 relatively to each other. Obviously, by manually turning the knob 19 the drum 20 and ratchet wheel 86 may be adjusted to any desired position, it being possible of course to manually actuate the mercury switch in this manner.

From the foregoing descriptions of the various embodiments of my invention it will be seen by those skilled in the art that I have provided a novel and improved clock and various timing arrangements employing it. My improved gear train is advantageous in that it employs only a very small number of parts and is very compact but yet providing a very great reduction in speed. For these reasons, by employing my invention a very compact and inexpensive clock may be manufactured and instruments employing timing mechanisms may be built very cheaply and in very compact, neat and convenient forms. As pointed out above, my invention is very flexible in adaptation to thermostats or similar instruments requiring clock mechanisms.

Various forms of my invention which have been disclosed are representative of some of its species and of applications to which it may be put. Numerous other forms, variations and applications which are within the scope of the invention may occur to those skilled in the art and therefore my invention is not to be limited by my disclosure but only in accordance with the appended claims.

I claim as my invention:

1. Mechanism of the class described comprising in combination, a pair of elements rotatable about the same axis, means for causing relative rotation between said elements, a member movable along said axis, means associated with said elements for causing a backward and forward reciprocating movement of said member in response to the relative movement between said elements, a normally stationary control device engaged by said member, and connections between said device and member by which said member causes a movement of said device corresponding to the forward movement of said member.

2. Mechanism of the class described comprising in combination, a pair of elements rotatable about the same axis, means for causing relative rotation between said elements, a member movable along said axis, means associated with said elements for causing a backward and forward reciprocating movement of said member in response to the relative movement between said elements, a ratchet wheel, and a normally stationary pawl therefor positioned to be intermittently actuated by said member upon, and as a direct result of, its reciprocation.

3. Mechanism of the class described comprising in combination, a pair of elements rotatable about the same axis, means for rotating said elements at constant but different speeds, a cam rotated by one of said elements, a cam follower rotated by the other of said elements whereby said cam follower is given a reciprocating movement longitudinally of said axis of rotation upon rotation of said elements, and a normally stationary control device positioned by said cam follower as a result of its longitudinal movement but independently of its rotary movement.

4. Mechanism of the class described comprising in combination, a pair of elements rotatable about the same axis, means for rotating said elements at constant but different speeds, a cam rotated by one of said elements, a cam follower rotated by the other of said elements whereby said cam follower is given a reciprocating movement longitudinally of said axis of rotation upon rotation of said elements, a ratchet wheel, and a normally stationary pawl therefor positioned to be intermittently actuated by said member upon, and as a direct result of, its reciprocation.

5. Mechanism of the class described comprising in combination, a pair of gears mounted to rotate about the same axis, said gears having an unequal number of teeth, a worm gear adapted to mesh with each of said pair of gears for driving them whereby they are rotated at slightly different speeds, a member movable longitudinally along said axis of rotation, means associated with said pair of gears for causing a backward and forward reciprocating movement of said member upon relative rotation between said pair of gears, a normally stationary control device engaged by said member and connections between said device and member by which said member causes a movement of said device corresponding to the forward movement of said member.

6. Mechanism of the class described comprising in combination, a pair of gears mounted to rotate about the same axis, said gears having an unequal number of teeth, a worm gear adapted to mesh with each of said pair of gears for driving them whereby they are rotated at slightly different speeds, a member movable longitudinally along said axis of rotation, means associated with said pair of gears for causing a backward and forward reciprocating movement of said member upon relative rotation between said pair of gears, a ratchet wheel, and a normally stationary pawl therefor positioned to be intermittently actuated by said member upon, and as a direct result of, its reciprocation.

7. Mechanism of the class described comprising in combination, a pair of gears mounted to rotate about the same axis, said gears having an unequal number of teeth, a worm gear in mesh with both of said pair of gears for rotating them simultaneously at unequal speeds, a cam rotated by a first of said pair of gears, a cam follower rotated by the second of said pair of gears, said cam follower being movable longitudinally of said axis of rotation and being biased into engagement with said cam, a ratchet wheel, and a pawl mounted on a stationary pivot and positioned to be engaged by said rotating cam follower to be pivoted due to the axial movement of said cam follower but being unaffected by its rotational movement, the pivotal movement of said pawl by said cam follower causing intermittent rotation of said ratchet wheel.

JOHN L. HARRIS.